No. 889,101. PATENTED MAY 26, 1908.
R. BRAUN.
GEAR CONNECTION.
APPLICATION FILED APR. 11, 1907.
2 SHEETS—SHEET 2.
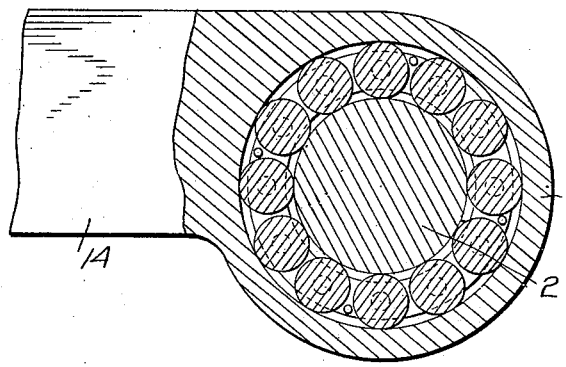
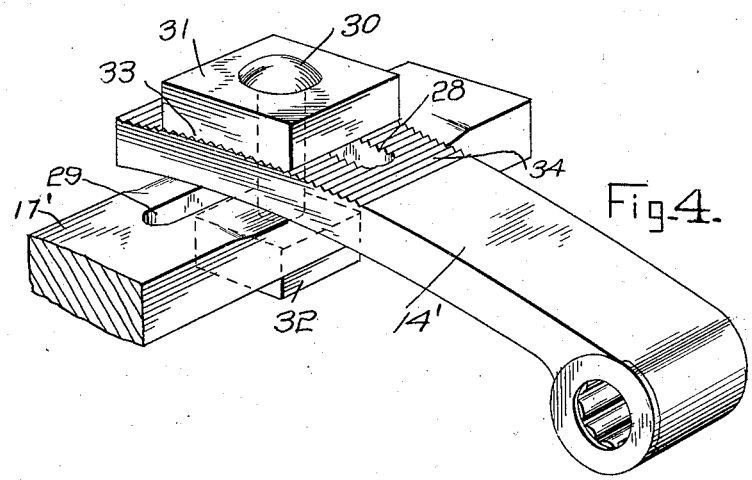

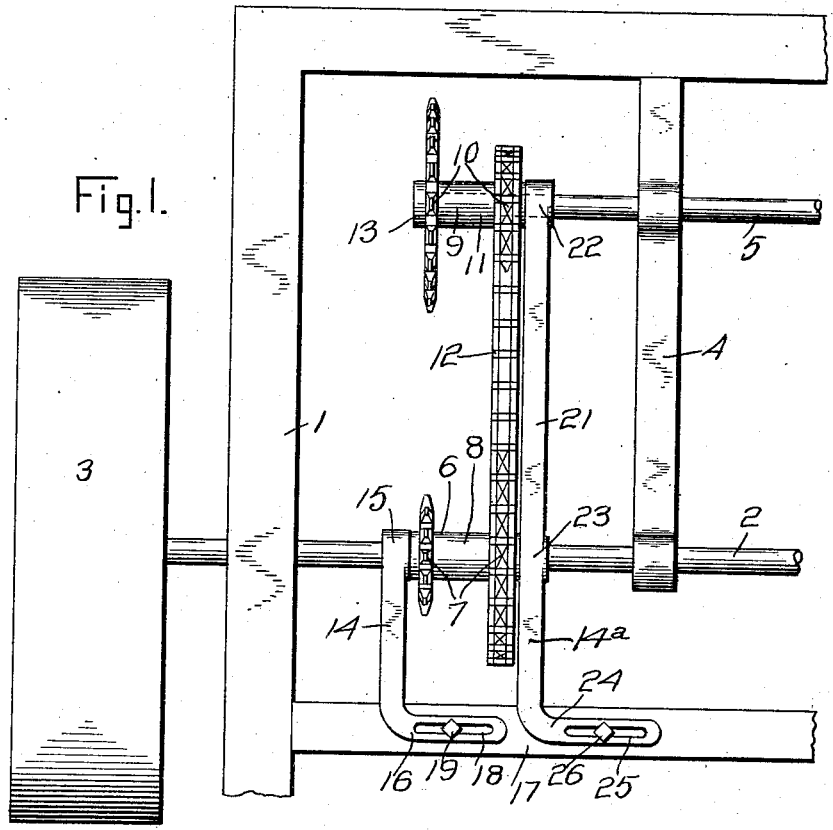

UNITED STATES PATENT OFFICE.

REINER BRAUN, OF GLEN ULLIN, NORTH DAKOTA.

GEAR CONNECTION.

No. 889,101.  Specification of Letters Patent.  Patented May 26, 1908.

Application filed April 11, 1907. Serial No. 367,577.

*To all whom it may concern:*

Be it known that I, REINER BRAUN, a citizen of the United States, residing at Glen Ullin, in the county of Morton, State of North Dakota, have invented certain new and useful Improvements in Gear Connections; and I do hereby declare the following to be a full, clear, and exact description of the invention, such as will enable others skilled in the art to which it appertains to make and use the same.

This invention relates to new and useful improvements in agricultural machines and it has particular reference to an improvement in the gear connections thereof.

The invention is adapted for use in connection with such apparatuses as binders, harvesters, mowers, and the like, in which there is considerable vibration between the power shaft, or the driving element, and the various devices operated therefrom. One of the chief objections in the art as now developed resides in the fact that such vibration tends to cause the connecting sprocket chains or belts, to creep, jump, or slip from their pulleys or sprockets, and it is a primary object of the present invention to reduce vibration to a minimum, and to thus overcome the objection noted.

The detailed construction will appear in the course of the following description, in which reference is had to the accompanying drawings forming a part of this specification, like characters of reference designating similar parts throughout the several views, wherein:—

Figure 1 is a plan view illustrating the frame of an agricultural machine of conventional form, in which the power shaft is directly connected to the axle wheel, and in which the improvement embodied in the present invention is incorporated. Fig. 2 is a detail perspective view of one of the elements of the present invention to be hereinafter specifically referred to. Fig. 3 is a fragmentary central longitudinal section of the element illustrated in Fig. 2, and Fig. 4 is a detailed perspective view of a modified form of the element shown in Fig. 2.

The invention as shown, is designed for use in connection with a machine including a supporting frame 1, from which is suspended in suitable bearings a power shaft 2. The latter may be driven from the traction wheel 3, adjacent thereto, by means of suitable gear connections or it may be directly connected to said traction wheel as shown. The shaft 2 is projected through a supporting arm 4, fixed to the frame 1 or through a bearing provided upon said arm. The arm 4 likewise constitutes the support for a shaft 5, arranged in spaced parallel relation to the shaft 2, and driven therefrom. The shaft 5 operates the driving connection of the machinery.

A casting 6 is splined upon the shaft 2, so as to rotate therewith. Said casting in the preferred embodiment of the invention includes parallel sprocket wheels 7 of graduated diameter and a connecting sleeve or web 8, between said wheels 7, the web 8 surrounding the shaft 2. The shaft 5 carries at its end a casting 9 similar in construction to the casting 6, and including sprockets 10 and a connecting sleeve or web 11. The sprockets 10 are graduated in size in reverse order to the sprockets 7. A chain 12 is employed as a driving connection between the shafts 2 and 5 and is trained over a selected alined pair of sprockets 7 and 10.

As previously stated, the casting 9 is mounted on the end of the shaft 5 and bears against a suitable stop 13 provided therefor. The casting 6 however, is mounted intermediate the length of the shaft 2, and in lieu of the stop 13, the member illustrated in Fig. 2 is employed. Such member is designated by the numeral 14 and comprises a shank terminating at one end in a sleeve 15 surrounding the shaft 2, and preferably provided with roller bearings illustrated in Fig. 5. The other end of the member 14 is bent at a substantial right angle as at 16, and overlies an adjacent stationary frame bar 17, included in the frame 1. The bent portion 16 is formed with a longitudinal slot 18, to receive therethrough a conventional bolt and nut fastening 19, which affords an adjustable connection for frictional engagement with the bent portion 16, and is projected through an opening 20, provided therefor in the frame bar 17.

Coöperating with the member 14 is a member 14ᵃ which comprises a shank 21 formed at its end with a sleeve 22, loosely surrounding the shaft 5 and provided with anti-friction roller bearings similar to those described. The shank 21 is formed intermediate its length with an integral sleeve 23, surrounding the shaft 2 on the opposite side of the casting 6 to the member 14, and provided with anti-friction roller bearings. Said shank at its other end has a portion 24 bent at right angles similarly to the bent portion 16 and provided with a longitudinal slot 25, through which is received bolt and nut fastenings 26 for frictional engagement with the bent portion 24, said bolt and nut fastenings being projected through an opening 27 provided therefor in the frame bars 17.

In Fig. 4 a modification is shown which, as disclosed, is applied to a member 14' similar to the member 14, but it will be equally as advantageously applicable to the member 14ª The member 14' corresponding to the member 14 above described has a straight shank provided adjacent its rear end with a longitudinal slot 28, and the frame bar designated 17' is provided with a slot 29 extending at right angles to the slot 28. A bolt 30 is projected through said slots in their registering relation and a follower plate 31 surrounds said bolt, a nut 32 being employed to bind the parts. By virtue of the provision of the angularly arranged slots 28 and 29, a longitudinal or lateral adjustment of the member 14 is provided. The plate 31 has a serrated underneath face 33 which is designed to positively engage serrations 34 provided upon the rear portion of the member 14.

In use, the members 14 and 21 bearing on opposite sides of the casting 6 serve to prevent the latter from vibrating, and owing to the fact that their respective sleeves 15 and 23 loosely surround the shaft 2 and that their bent ends 16 and 24 are adjustably connected with the frame bar 17 through the means described, said members may be adjustably positioned with relation to the casting 6 to take up the wear of the latter or to compensate for the varying sizes which may be employed on different machines. The same function is attained by the sleeve 22, with relation to the casting 9, in which function said sleeve of course co-acts with the stop 13. It is obvious that said stop may be constructed integral with or fixed to the member 14 without affecting the functions contemplated or the general mode of use.

From the foregoing description it will be seen that simple and efficient means are provided for attaining the objects of the invention; while the elements herein shown and described are well adapted to serve the functions set forth, it is obvious that various minor changes may be made in the proportions, shape and arrangement of the several parts without departing from the spirit and scope of the invention as defined in the appended claims.

What is claimed is:

1. In a machine of the type set forth, the combination with parallel shafts, sprocket wheels carried thereon, and a chain trained over said sprocket wheels, of members having portions thereof surrounding said shafts and bearing against opposite sides of said sprocket wheels, and an adjustable connection between said members and a stationary object, whereby said members may be moved along the longitudinal axis of said shafts.

2. In a machine of the type set forth, the combination with a shaft and a rotatable gear element thereon, of a stationary bar, and members for taking up the vibration of said gear element and arranged on opposite sides thereof, each of said members comprising a shank terminating at one end in a sleeve loosely surrounding said shaft, and having its other end bent to overlie said bar and provided with a longitudinal slot, and fastening devices projected through said bar and through said slot and adjustably engaging said bent end at selected points thereon.

3. In a machine of the type set forth, the combination with a shaft and a rotatable gear element thereon, of a stationary bar and members for taking up the vibration of said gear element and arranged on opposite sides thereof, each of said members comprising a shank formed with a sleeve loosely surrounding said shaft, and having its other end bent at a substantial right angle and formed with a longitudinal slot, and bolt and nut fastenings engaged through said bar and through the slots in each of said angular ends, and formed to frictionally engage said angular ends to hold said members at selected adjustments with respect to the axis of said shaft.

In testimony whereof, I affix my signature, in presence of two witnesses.

REINER BRAUN.

Witnesses:
   F. A. TAVIS,
   L. T. NELSON.